March 17, 1970     W. T. BIRGE     3,500,966
DISK BRAKE EMBODYING CALIPER POSITIONER
Filed May 29, 1968     2 Sheets-Sheet 1
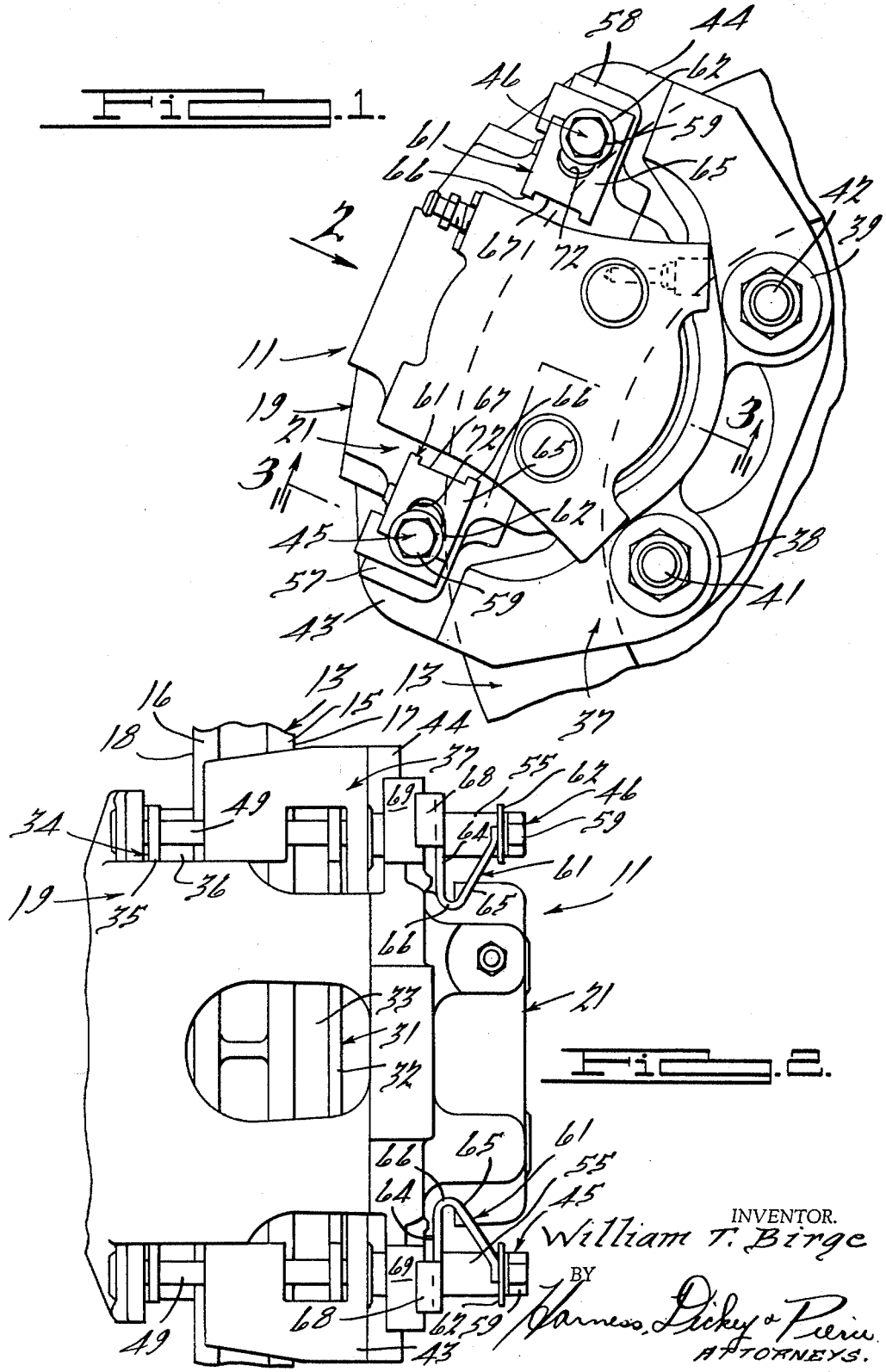
INVENTOR.
William T. Birge
BY
Harness, Dickey & Pierce
ATTORNEYS.

March 17, 1970 W. T. BIRGE 3,500,966
DISK BRAKE EMBODYING CALIPER POSITIONER
Filed May 29, 1968 2 Sheets-Sheet 2

INVENTOR.
William T. Birge
BY
Harness Dickey & Pierce
ATTORNEYS.

United States Patent Office 3,500,966
Patented Mar. 17, 1970

3,500,966
DISK BRAKE EMBODYING CALIPER
POSITIONER
William T. Birge, Plymouth, Mich., assignor to Kelsey-Hayes Company, a corporation of Delaware
Filed May 29, 1968, Ser. No. 733,121
Int. Cl. F16d 55/18, 65/54, 65/22
U.S. Cl. 188—73                                    11 Claims

ABSTRACT OF THE DISCLOSURE

A disk brake assembly of the sliding caliper type embodying resilient positioners for controlling the sliding movement of the caliper and for adjusting the at-rest position of the caliper. Each resilient positioner comprises a yieldable spring connected between the torque reaction member and the caliper, the spring being mounted on a pin which slidably supports the caliper.

Background of the invention

This invention relates to a disk brake assembly of the sliding caliper type and more particularly to such a brake embodying an improved caliper positioner.

In one well known type of disk brake assembly, the caliper has a pair of legs that straddle the associated brake disk and each of which is associated with a respective brake pad. An actuating mechanism is carried by one of the caliper legs for moving the associated brake pad into frictional engagement with the disk and for creating a reactive force that slides the caliper in a direction parallel to the axis of rotation of the disk to bring the other brake pad into frictional engagement with the disk. In this type of disk brake, it is essential that the sliding movement of the caliper be controlled or limited so that the caliper will not be free to slide excessively when the brake is not activated. Various structures have been proposed for permitting the sliding movement of the caliper upon brake actuation and for preventing any substantial movement of the caliper when the brake is not activated. Examples of some of the prior art approaches to this problem may be found in United States Letters Patent 3,258,089, entitled "Spot Type Disk Brake," issued June 28, 1966 in the name of E. J. Hayes et al.; United States Letters Patent 3,312,308, entitled "Disk Brake," issued Apr. 4, 1967 in the name of S. F. Watanabe; and application Ser. No. 623,443, filed Mar. 15, 1967 and Ser. No. 602,794, filed Dec. 19, 1966 in the name of Harvey C. Swift.

In addition to the aforenoted functions, the support should permit the caliper to shift slightly relative to the associated disk as the linings of the friction pad become worn. That is, as the lining of the pad on the reactive side of the caliper becomes worn, the caliper should shift so that this lining maintains approximately the same spacing relative to the disk in order that the pedal travel be relatively uniform throughout the life of the linings. Certain of the constructions illustrated and described in the aforenoted patents effect this automatic adjustment in the at-rest position of the caliper. However, the constructions either do not permit the caliper to be repositioned when new linings are installed or require the replacement of extensive components to so reposition the caliper.

It has been proposed to employ a specially formed seal between the actuating piston and caliper of a sliding caliper disk brake for returning the components to an at-rest position and for compensating for wear of the brake pad linings. This type of seal undergoes a resilient deformation during the piston's actuating movement and exerts a restoring force upon the piston and caliper when the brake is released. This type of seal will also permit sliding movement of the piston after a predetermined degree of wear takes place so as to effect a form of adjustment to compensate for lining wear. Although this type of arrangement is widely used, the restoring force of the seal is insufficient in many instances.

It is, therefore, a principal object of this invention to provide an improved supporting arrangement for a sliding caliper type disk brake.

It is another object of this invention to provide a disk brake positioner that automatically adjusts the at-rest position of the caliper to compensate for lining wear.

It is another object of this invention to provide such a brake positioner that may be conveniently replaced when the linings are renewed.

Summary of the invention

This invention is particularly adapted to be embodied in a disk brake assembly of the sliding caliper type. The brake assembly includes a caliper having first and second legs adapted to be disposed on opposite sides of an associated brake disk. First and second brake pads are associated with the first and second caliper legs, respectively, and juxtaposed to respective oppositely facing brake surfaces of the disk. Actuating means are carried by the first caliper leg for moving the first brake pad into frictional engagement with the associated disk braking surface. A torque plate is fixed against rotation relative to the disk and means support the caliper for sliding movement relative to the torque plate and disk and for precluding rotation of the caliper relative to the disk. Spring means are operatively interposed between the caliper assembly and the torque plate for yieldably resisting this sliding movement. The spring means is constructed so that it will experience substantially linear deflection until a predetermined amount of deflection has occurred at which time the spring means takes a permanent set. On the next successive sliding movement of the caliper, the spring means again exerts a substantially linear force in resistance to the sliding movement.

In a disk brake of the type described in the preceding paragraph, the means that slidably supports the caliper may comprise a pin that is affixed to the torque plate and which receives the caliper. The spring means takes the form of a spring having angularly disposed legs that are interposed between the caliper and one end of the pin means.

Brief description of the drawings

FIGURE 1 is a side elevational view of a portion of a disk brake embodying this invention.

FIGURE 2 is a plan view taken generally in the direction of the arrow 2 in FIGURE 1.

Detailed description of the preferred embodiment

Figure 3:
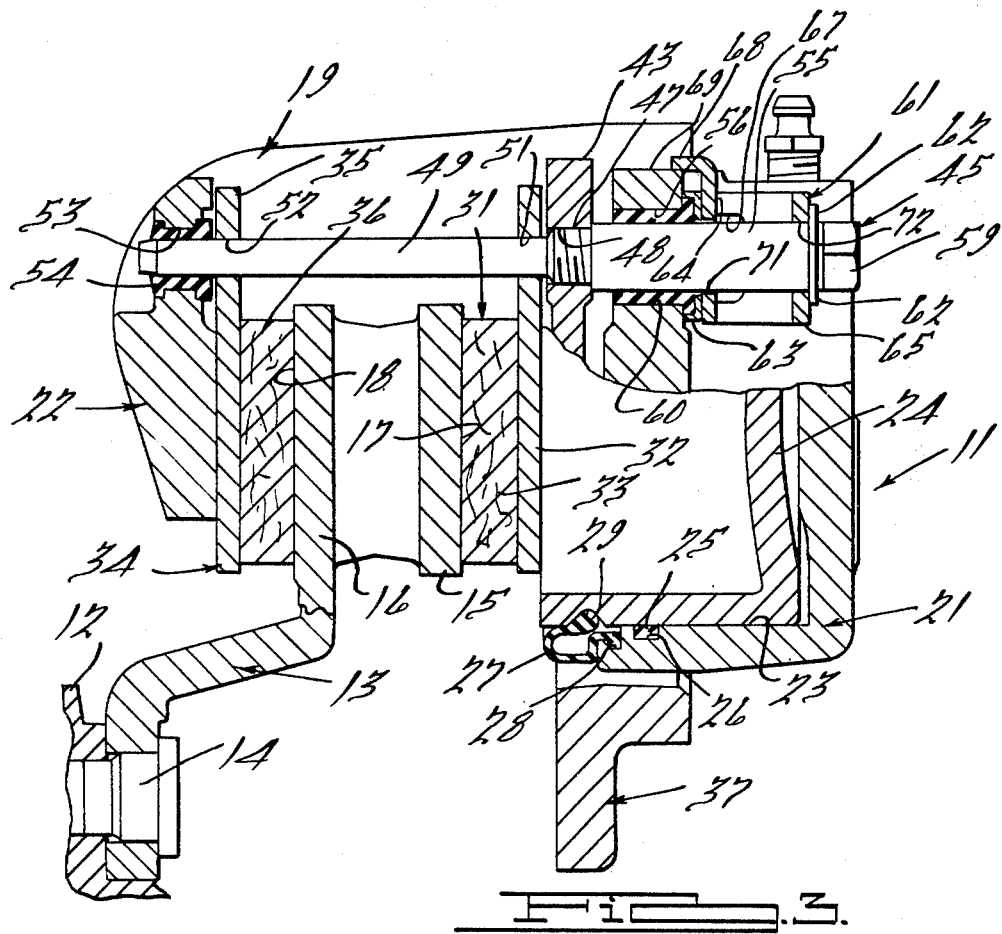
FIGURE 3 is an enlarged cross-sectional view taken along the line 3—3 of FIGURE 1.

In the drawings, a disk brake assembly embodying this invention is identified generally by the reference numeral 1. The brake assembly 11 is particularly adapted for use in motor vehicles for braking the rotation of a wheel, shown partially in FIGURE 3 and identified generally by the reference numeral 12, that is affixed to a disk 13 as by threaded fasteners 14. The disk 13 is of the ventilated type and is comprised of a pair of spaced annular, integrally connected portions 15 and 16 that define oppositely facing braking surfaces 17 and 18, respectively.

A caliper assembly, indicated generally by the reference numeral 19, is supported adjacent the disk 13 in a manner which will become more apparent as this description proceeds. The caliper assembly 19 is comprised of a first leg 21 that is juxtaposed to the disk braking surface 17 and second leg 22 that is juxtaposed to the surface 18. The caliper legs 21 and 22 are integrally connected by means of intermediate portions that extend across the outer periphery of the disk 13 and define an opening or throat (FIGURE 2) adjacent the outer periphery of the disk 13 for facilitating cooling of the disk 13.

The caliper leg 21 carries an actuating device in the form of a fluid motor that is comprised of a cylinder bore 23 in which a piston 24 is supported for reciprocation. The cylinder bore 23 is adapted to be pressurized by any suitable source of fluid pressure (not shown) such as by a master cylinder that is operated by a conventional brake pedal in a known manner. A generally rectangular seal 25 is interposed in a circumferential groove 26 formed in the caliper leg 21 around the cylinder bore 23. The seal 25 engages the piston 24 for precluding fluid leakage and for exerting a restoring force upon the piston 24 when the bore 23 is not pressurized. During normal actuation of the piston 24, the seal 25 will deform. Upon the release of the fluid pressure, the seal 25 tends to return to its normal position and will exert a restoring force upon the piston 24 in a known manner.

An annular boot 27 is also received in a circumferential groove 28 formed at the outer end of the cylinder bore 23 and a circumferential groove 29 formed around the piston 24 for protecting the sliding surfaces of the piston 24 and cylinder bore 23 from the ingress of dirt and other foreign material.

A first brake pad, indicated generally by the reference numeral 31, is interposed between the outer end of the piston 24 and the associated disk braking surface 17. The first brake pad 31 has a backing plate 32 that is engaged by the piston 24 and to which a frictional lining material 33 is affixed in any known manner. A second brake pad, indicated generally by the reference numeral 34, is interposed between the caliper leg 22 and the disk braking surface 18. The brake pad 34 is also comprised of a backing plate 35 to which a frictional lining material 36 is affixed in any known manner.

The caliper assembly 19 is supported for sliding movement relative to the disk 13 but is held against rotation about the axis of rotation of the disk 13 by means including a torque plate, indicated generally by the reference numeral 37. The torque plate 37 is formed with bosses or extensions 38 and 39 that are adapted to receive fastening means 41 and 42 for holding the torque plate 37 against rotation relative to any suitable portion of the vehicle, such as the wheel spindle (not shown). The torque plate 37 has outwardly extending arms 43 and 44 that receive and straddle the caliper leg 21. Caliper supporting pins 45 and 46 each have an intermediate threaded portion 47 (FIGURE 3) that is received in a complementary tapped opening 48 formed in the respective torque plate leg 43 or 44 for rigidly fixing the respective pin 45 or 46 to the torque plate 37. Adjacent the threaded portion 47, each of the pins 45 and 46 is formed with a smaller diameter cylindrical portion 49 that extends through respective apertures 51 and 52 formed in the brake pad backing plates 32 and 35 for supporting the pads 31 and 34 with respect to the torque plate 37. The outer ends of the portions 49 extend through enlarged bores 53 formed in the caliper leg 22 and grommets 54 are interposed between the bore 53 and this end of the pin 46.

On the opposite side of the torque plate 37, the pins 45 and 46 are formed with enlarged diameter cylindrical portions 55 that extend through enlarged bores 56 formed in respective ears 57 and 58 formed integrally at opposite sides of the caliper leg portion 21. Grommets 60 are interposed between the bores 56 and the respective portions 55 of the pins 45 and 46. The portions 55 extend beyond the ears 57 and 58 and terminate in hexagonal headed portions 59.

Figures 4, 5:
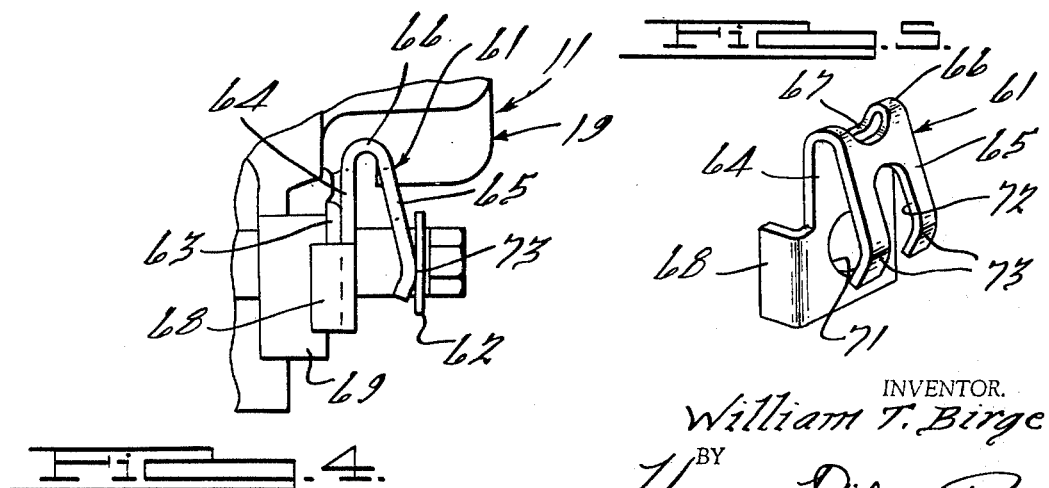
FIGURE 4 is a plan view, in part similar to FIGURE 2, showing one of the brake positioners in a deformed position.
FIGURE 5 is a perspective view of one of the brake positioners.

Caliper positioners, indicated generally by the reference numeral 61 and shown in perspective in FIGURE 5, are interposed between washers 62 that abut the pin heads 59 and cup-shaped washers 63 that encircle the pin portions 55 and engage the outer face of the caliper ears 57 and 58. The caliper positioners have angularly related leg portions 64 and 65 that are interconnected by an arcuate segment 66. The arcuate segment 66 is cut away, as at 67, to provide an effective weakening or thinning in this area for a reason which will become more apparent as this description proceeds. The leg 64 extends parallel to the outer face of the respective caliper ear 57 or 58. An integral tab 68 extends from the inner extremity of the leg 64 and is adapted to abuttingly engage a facing shoulder 69 of the respective caliper ear 57 to hold the positioner 61 against any substantial rotation with respect to the pin section 55. It is to be understood that the angular relationship between the positioners 61 and the caliper assembly 19 shown and described is exemplary only. That is, the positioners 61 may be disposed at any desired and convenient angular relationship with respect to the associated pins 45 and 46.

An enlarged bore 71 is formed in the positioner leg 64 through which the pin portion 55 passes. The leg 65 is formed with a slotted opening 72 adjacent the pin 55 so as to clear the pin 55. The inner extremity of the leg 64 is reversely bent to form an arcuate surface 73 that engages the washer 62.

OPERATION

Upon initial installation and before the linings 33 and 36 become worn, the brake assembly 11 appears as shown in FIGURES 1 through 3 in its retracted position. When the piston 24 is actuated by pressurizing the cylinder bore 23, the piston 24 moves to the left relative to the caliper assembly 19 and forces the brake pad 31 into engagement with the disk braking surface 17. At the same time, a reactive force is exerted on the caliper 19 tending to shift it to the right as shown in FIGURE 3. As has been noted, the rectangular seal 25 will deflect during this movement. The positioning devices 61 tend to resist this movement but their resistance to deflection about the arcuate section 66 is insufficient to overcome the hydraulic forces. The legs 65 of the positioners 61 deflect toward the legs 64 through resilient deflection of the weakened arcuate section 66. Generally, the device 61 acts as a substantially linear spring—that is, the resistive force is directly proportional to the degree of deflection. Deflection of the positioning devices 61 permits the caliper 19 to shift to the right so as to force the brake pad 34 into frictional engagement with the disk braking surface 18. During this movement, the caliper legs 22 slides upon the portions 49 of the pins 45 and 46 and the ears 57 and 58 of the caliper leg 21 slide on the pin portions 55. The grommets 54 and 60 may be deflected to some extent during this movement. The frictional torque forces exerted upon the brake pads 31 and 34 are transmitted to the torque plate 37 in any suitable manner, as through the pins 45 and 46.

Upon release of the hydraulic force upon the piston 24, the rectangular seal 25 will tend to return the piston 24 to a retracted position. At the same time, the positioning devices 61 will again return to their undeflected position shift the caliper assembly 19 back to the left so that the brake pad 34 is retracted and the brake assembly is freed. The deflection of the grommets 54 and 57 will also be relieved and this force may also serve to return the caliper assembly 19 to its retracted position.

It should be readily apparent that as the degree of wear of the linings 31 and 35 increases, the piston 24 and caliper 19 will have to move further with respect to each other to effect engagement of the brake pads 31 and 34 with the braking surfaces 17 and 18. After a predetermined degree of lining wear has taken place, the deflection of the positioning devices 61 will exceed their elastic limit and these devices will take a permanent set as shown in FIGURE 4. That is, the arcuate section 66 will be permanently deflected so that the angle between the legs 64 and 65 is less than the as-installed angle. The amount of weakening of the arcuate segments 66 determines the force at which permanent deflection occurs. The construction of the positioning devices 61 is, however, such that subseqeunt resilient deflection of the legs 65 toward the legs 64 will require substantially the same force for a given degree of deflection as previously. Hence the positioning devices 61 exert substantially the same resistance to a given degree of movement regardless of the degree of permanent set of the arcuate section 66. The width of the slots 72 accommodates the movement of the legs 65 as should be readily apparent.

When the brake pads 31 and 34 are in their retracted position, the positioning devices 61 will resist any sidewise movement of the caliper due to inertia forces. That is, the caliper 19 will be effectively held against any movement in a direction parallel to the axis of rotation of the disk 13. The positioning devices 61 will not interfere with the actuation of the brake assembly 11, however.

When the linings 33 and 36 are worn sufficiently to require replacement, the pins 45 and 46 are withdrawn by applying a wrench or appropriate tool to their heads 59 and rotating the threaded portions 47 free of the tapped holes 48. Withdrawal of the pins 45 and 46 then permits replacement of the brake pads 31 and 34. At the same time, the positioning devices 61 may also be renewed since these devices are also supported upon the pins 45 and 46. Thus, all components that require replacement may be serviced at the same time through renewal of only the two pins.

While it will be apparent that the preferred embodiment of the invention disclosed is well calculated to fulfill the objects above stated, it will be appreciated that the invention is susceptible to modification, variation and change.

What is claimed is:

1. A disk brake assembly of the slidng caliper type comprising a caliper having first and second legs adapted to be disposed on opposite sides of an associated brake disk having oppositely facing braking surfaces, a first brake pad associated with said first caliper leg and juxtajosed to a first of the disk braking surfaces, a second brake pad associated with said second caliper leg and juxtaposed to a second of the disk braking surfaces, a torque reaction member adapted to be fixed against rotation relative to the brake disk, means for supporting said caliper for sliding movement relative to said torque reaction member in a direction substantially perpendicular to the axis of rotation of the disk, actuating means carried by said first caliper leg for urging said first brake pad into frictional engagement with the first braking surface of the disk and for sliding said caliper relative to the disk for engagement of said second brake pad with the second braking surface of the disk, and spring means operatively interposed between said caliper and said torque reaction member for yieldably resisting said sliding movement and for returning said caliper to an at-rest position upon release of said actuating means, the at-rest position being dependent upon the degree of wear of said brake pads, said spring means being constructed and arranged to undergo substantially linear resilient deflection upon said sliding movement of said caliper until a predetermined amount of deflection has occurred due to a predetermined degree of wear of said brake pads, said spring means taking a permanent set after said predetermined amount of deflection for adjusting the at-rest position of said caliper and being adapted to experience substantially linear resilient deflection after taking said permanent set upon the next successive sliding movement of said caliper.

2. A disc brake assembly as set forth in claim 1 wherein the spring means comprises a first leg adapted to be in operative engagement with the torque reaction member, a second leg angularly disposed with respect to said first leg and adapted to be operatively engaged with the caliper and an intermediate bight connecting said first leg integrally to said second leg, the deflection of said spring means occuring substantially at said bight.

3. A disk brake assembly as set forth in claim 1 wherein the means for slidably supporting the caliper relative to the torque reaction member comprises pin means, said spring means being supported upon said pin means for facilitating replacement of said spirng means upon replacement of the brake pads.

4. A disk brake assembly as set forth in claim 3 wherein the spring means comprises a first leg adapted to be in operative engagement with the torque reaction member, a second leg angularly disposed with respect to said first leg and adapted to be operatively engaged with the caliper and an intermediate bight connecting said first leg integrally to said second leg, the deflection of said spring means occuring substantially at said bight, apertures formed in each of said legs for receiving in part said pin means.

5. A disk brake assembly as set forth in claim 1 wherein the means for slidably supporting the caliper upon the torque reaction member comprises pin means fixed to said caliper and slidably supported in said torque reaction member, said pin means having an enlarged headed portion providing the operative engagement between said caliper and said spring means, said spring means being engaged with said torque reaction member and received upon said pin means.

6. A disk brake assembly as set forth in claim 5 wherein the pin means has a portion extending between the first and second caliper legs, each of the brake pads being supported upon said pin means portion for replacement of said brake pads and said spring means by removal of said pin means.

7. A disk brake assembly as set forth in claim 6 wherein the spring means comprises a first leg adapted to be in operative engagement with the torque reaction member, a second leg angularly disposed with respect to said first leg and adapted to be operatively engaged with the caliper and an intermediate bight connecting said first leg integrally to said second leg, the deflection of said spring means occuring substantially at said bight, apertures formed in each of said legs for receiving in part said pin means.

8. A disk brake assembly as set forth in claim 7 wherein the intermediate portion of the spring means is relieved for determining the force at which said spring means undergoes permanent deflection.

9. A positioning spring for use in a sliding caliper type disk brake for yieldably resisting sliding movement of the caliper and for adjusting the at-rest position of the caliper, said positioning spring comprising a first leg having an aperture therein for receiving a brake assembly component, a second leg angularly disposed with respect to said first leg, said second leg defining an opening for receiving the brake assembly component and for facilitating angular displacement of said legs without interference with the brake assembly component, and an arcuate intermediate portion integrally connecting said legs and about which said legs resiliently deflect, said intermediate portion being weakened to facilitate bending thereof, said legs being adapted to be engaged with respective, relatively movable parts of the brake assembly.

10. A positioning spring as set forth in claim 9 wherein the second leg is curved at its outer end and adjacent its opening for localized contact with the associated brake assembly part.

11. A positioning spring as set forth in claim 9 wherein a tab is formed integrally with the first leg, said tab extending substantially perpendicularly with respect to said first leg and adapted to coact with the brake assembly for precluding any substantial rotation of said positioning spring about the brake assembly component.

References Cited

UNITED STATES PATENTS

| | | | |
|---|---|---|---|
| 2,743,790 | 5/1956 | Bricker | 188—196 X |
| 2,973,837 | 3/1961 | Wilson | 188—73 |

DUANE A. REGER, Primary Examiner

U.S. Cl. X.R.

188—196, 216

PO-1050
(5/69)

UNITED STATES PATENT OFFICE
CERTIFICATE OF CORRECTION

Patent No. 3,500,966      Dated March 17, 1970

Inventor(s) William T. Birge

It is certified that error appears in the above-identified patent and that said Letters Patent are hereby corrected as shown below:

Column 5, line 62, "perpendicular" should be --parallel--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,500,966    Dated March 17, 1970

Inventor(s) William T. Birge

It is certified that error appears in the above-identified patent and that said Letters Patent are hereby corrected as shown below:

Claim 5, line 38, delete "caliper" and insert -- torque reaction member -- ; delete "reac-"; line 39, delete "tion member" and insert -- caliper -- ; line 41, delete "caliper" and insert -- torque reaction member -- ; line 42, delete "torque reaction member" and insert -- caliper --

Signed and sealed this 25th day of May 1971.

(SEAL)
Attest:

EDWARD M. FLETCHER, JR.
Attesting Officer

WILLIAM E. SCHUYLER, JR.
Commissioner of Patents